April 27, 1926.

A. M. DIXON 1,582,868

CONTROLLING INSTRUMENT

Filed Feb. 19, 1925

Inventor:
Arnold M. Dixon,
by Emery, Booth, Janney & Varney
Attys.

April 27, 1926.
A. M. DIXON
1,582,868
CONTROLLING INSTRUMENT
Filed Feb. 19, 1925　　2 Sheets-Sheet 2
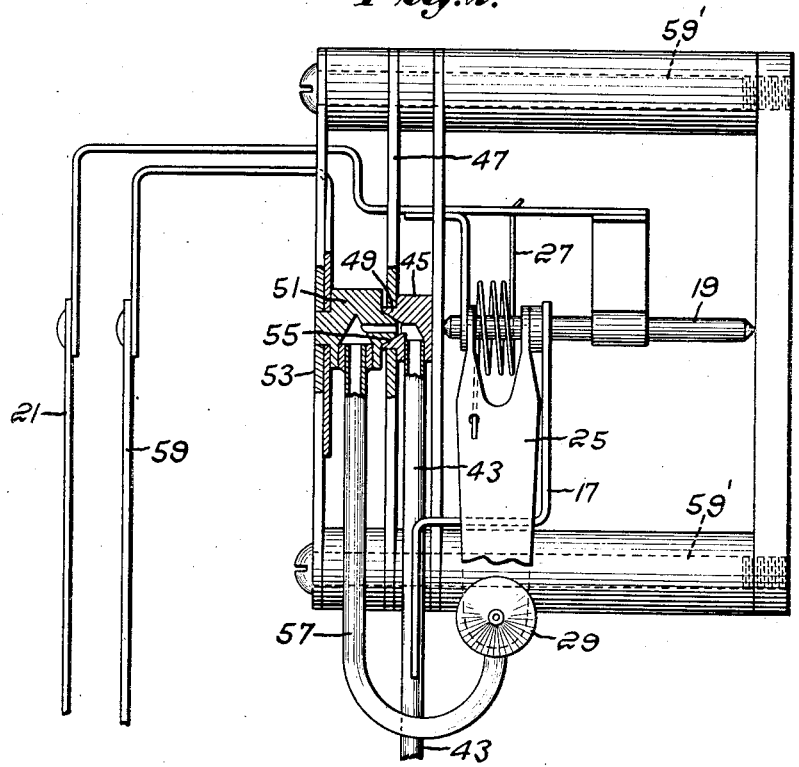
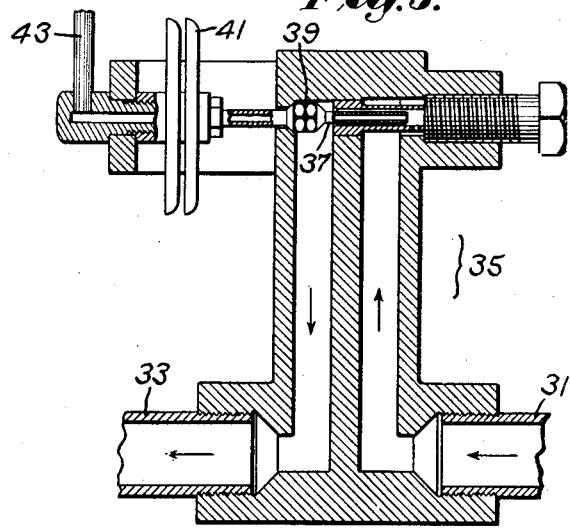
Inventor:
Arnold M. Dixon,
by Emery, Booth, Janney & Varney
Attys.

Patented Apr. 27, 1926.

1,582,868

UNITED STATES PATENT OFFICE.

ARNOLD M. DIXON, OF FOXBORO, MASSACHUSETTS, ASSIGNOR TO THE FOXBORO COMPANY, OF FOXBORO, MASSACHUSETTS, A CORPORATION OF MASSACHUSETTS.

CONTROLLING INSTRUMENT.

Application filed February 19, 1925. Serial No. 10,430.

*To all whom it may concern:*

Be it known that I, ARNOLD M. DIXON, a citizen of the United States, and a resident of Foxboro, county of Norfolk, and State of Massachusetts, have invented an Improvement in Controlling Instruments, of which the following description, in connection with the accompanying drawings, is a specification, like characters on the drawings representing like parts.

This invention relates to instruments designed for controlling the flow of pressure fluid through a conduit, which flow of fluid may in turn be utilized, if desired, to operate some other mechanism, such, for instance, as a diaphragm valve or other servo-motor. The purpose of the invention is to provide certain improvements in an instrument of this type whereby it will be more durable, accurate and efficient.

My invention will be readily understood by reference to the following description of the instrument shown by way of example in the accompanying drawings, wherein:

Fig. 2 is a view on an enlarged scale of the governing mechanism which appears at the upper left hand portion of Fig. 1, as seen from the right in Fig. 1 with parts in section;

Fig. 3 is an enlarged vertical section through the control head which appears at the bottom of the casing in Fig. 1.

Figure 1:
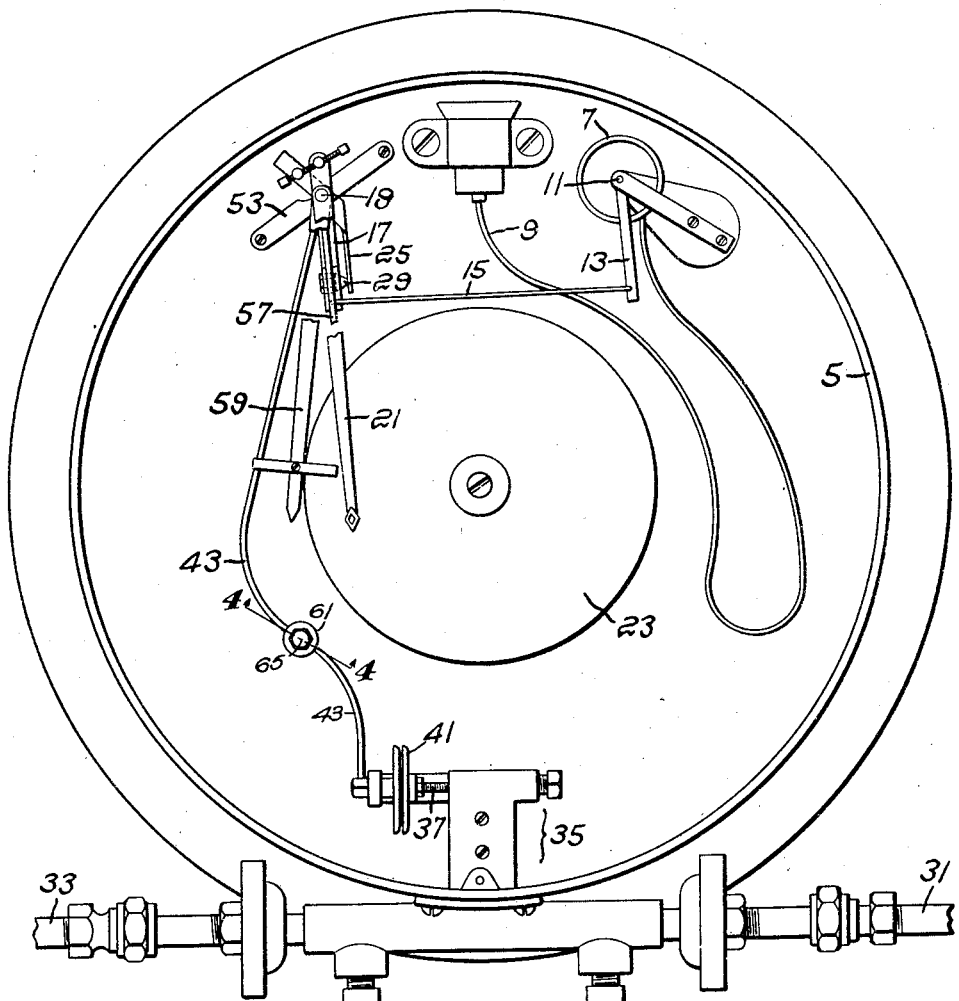
Fig. 1 is a front elevation of a controller recorder with the front removed to show the interior.

Referring to the drawings, particularly to Fig. 1, I have there shown a controlling instrument organized in the usual case 5 and embodying a pressure responsive element 7 which may be of the helical tube type disclosed in Letters Patent No. 1,195,334, dated Aug. 22, 1916, to Edgar H. Bristol, and which is connected by a capillary tube 9 to a suitable source of pressure exterior to the casing such, for instance, as a thermometer bulb when the instrument is designed to control in response to variations of temperature. The responsive element may turn a shaft 11 carrying a crank arm 13 from which a connecting rod 15 extends to a parallel crank 17 adapted to turn the shaft 19 (see Fig. 2). Movement of the shaft 19 is, of course, proportional to the pressure effect measured by the responsive element 7 and in the embodiment of the invention shown the instrument is a recording instrument as well as a controlling instrument and the shaft 19 may carry the pen 21 adapted to make a record of the temperature on the usual polar chart (not shown) revolved by the clock movement 23.

The movement of the responsive member 7 is also made to operate a valve to control the passage of fluid through a conduit in accordance with the variations in the pressure effect measured by the responsive element. Referring more particularly to Fig. 2, the controlling action may be effected through a valve couple which may comprise a valve 25 loosely mounted to swing about the shaft 19 and normally urged in one direction, away from the reader in Fig. 2, by a light spring 27. This spring tends to close the valve 25 against its seat on the cooperating ported member 29 of the valve couple. The valve 25 may be moved against the action of the spring by the crank 17. For example, if the instrument is controlling in accordance with temperature variations and the temperature rises causing the crank 13 to swing clockwise viewing Fig. 1, the crank 17, viewing Fig. 2, will move away from the reader, releasing valve 25 to the spring 27 and permitting the latter to close the former against its seat on element 29 and this closing may be made by means hereinafter more fully to be described to control the action of a heating medium. If the temperature continues to rise for a short time, the parallel cranks will continue to move, the crank 17 moving away from the valve 25, and the pen 21 will be moved accurately to record the temperature. If the temperature again falls as a result of the controlling action, the arm 17 will swing towards the reader in Fig. 2 and make contact with the valve 25 and finally lift it from the valve seat 29 and this opening of the valve couple may be made again to bring the heating medium again into action.

In the embodiment of the invention shown the valve couple 25—29 controls the passage of pressure fluid through a conduit, for instance, from the pipe 31 at the right to the pipe 33 at the left, this may be effected through a control head 35, the operation of which may be more readily understood from Fig. 3. In the position shown in the figure pressure fluid is flowing from the right through the control head and around the hollow stem 37 of the double pilot valve 39 to the pipe 33. Pressure fluid also seeps out through this valve stem, through the diaphragm servo-motor 41 carrying the same and, by a connection hereinafter more fully to be described, through pipe 43 (herein illustrated as comprising two connected sections) to the atmosphere through the ported member 29 which, when the parts of the control head are in the position shown in Fig. 3, is not closed by the valve 25. The pilot valve 39 is seated on the left hand and at the right thereof communication is open between the pipes 31 and 33 as already described. Now, if the valve 25 cuts off the leakage of air through the diaphragms, pressure will build up inside the same and they will expand shifting the pilot valve 39, which closes against the right hand seat cutting off pipe 31 from 33 and at the same time opening at the left hand side an exhaust to atmosphere from pipe 33. This action may be utilized, as, for instance, by relieving the pressure in a diaphragm motor, to close a valve and cut off the supply of a heating medium. When, as a result of this cooling takes place and the temperature falls, the arm 17 is swung counterclockwise viewing Fig. 1 and lifts the valve 25 away from its seat 29. The diaphragms 41 exhaust to atmosphere through the member 29 and collapse returning double pilot valve 39 to the position of Fig. 3, closing the communication between pipe 33 and the atmosphere at the left of the pilot valve and permitting pressure fluid from pipe 31 to flow around the hollow valve stem 37 to the pipe 33. This flow of pressure fluid may be utilized to operate a diaphragm motor to open a valve and thus bring into action a heating medium. Mechanisms of this type are more fully described in the patents to E. H. Bristol, 1,326,640, Dec. 30, 1919, and 1,405,181, Jan. 31, 1922.

To permit the controlling action of the valve couple 25—29 to be effected at different temperatures, the ported member 29 is preferably made adjustable and herein it is adapted to be swung about the same axis as that about which the valve 25 swings. To permit this adjustment a connection must be made between a revolvable or rotatable member 29 and a fixed member or control head 35. My invention provides an improved method of making this connection and in particular one which permits the use of durable metal piping which is rigid in the sense of being non-flaccid. Herein (see Fig. 2) the pipe 43 extending from the control head enters a hollow bearing 45 which may be fixed to one of the plates, as 47, forming a part of the supporting framework of the control assembly illustrated in Fig. 2 and located in the axial line of the shaft 19. The element 45 may be provided at one side with a cone-shaped socket or bearing seat 49 communicating, as seen from Fig. 2, with its hollow interior and thus with the pipe 43. Coaxially organized with the shaft 19 and with the bearing member 45 is a hollow shaft or hub 51 which may be trunnioned on one side in the fixed plate 53 and on the other side by means of the coned extension 55 in the coned socket 49, the extension 55 having a passage therein as illustrated connecting the hollow interior of the shaft 51 with the interior of the bearing 45.

The ported member 29 is rigidly supported at a fixed distance from the shaft or hub 51 and in the present instance this may be effected by means of a section of pipe 57 communicating with the hollow interior of the hub or shaft 51 and with the interior of the ported member 29.

By turning the shaft 51 in its bearings about the common center line thereof and of the shaft 19, the ported member 29 is swingingly adjusted about said center line. This adjustment may conveniently be effected by means of the pointer 59 soldered at one end to the shaft 51 and adapted to extend with the pen 21 over the face of the chart. Since the shaft 51 and the pen shaft 19 turn about the same axis, the chart serves as an accurate positioning guide for the valve. The connection between the bearing 45 and the member 51 provides a swivel joint permitting the adjusting movement of the valve at the center of this adjusting motion. The coned connection between these two parts provides an easy bearing and a tight joint. The pipes 43 and 57 may be rigid and thus of durable metal. No strain is placed on the piping by the adjusting movement of the valve and no impediment on that adjusting movement is caused by the pipe connection. The parts are readily assembled on a framework such as is illustrated in Fig. 2 embodying plates spaced by suitable sleeves on pillars 60. Thus bearing member 45 may be secured to plate 47, shaft 51 dropped into place and secured by the application of plate 53. The fastening of plate 53 will press the bearing surfaces 49 and 55 together to form a tight joint and also provide sufficient friction to hold shaft 51 in any adjusted position into which it may be brought by manipulation of pointer 59. The flat plate or strap 53 being secured at its ends remote from where it bears at its middle against the shaft provides a yielding pressure so that while the bearing surfaces are pressed together with sufficient tightness to form a non-leaking joint they are not so rigidly clamped as to prevent adjusting movement to be effected when desired.

Figure 4:
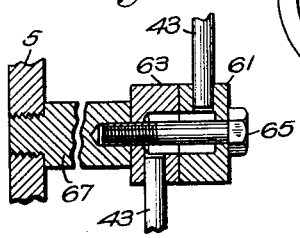
Fig. 4 is an enlarged section on line 4—4 of Fig. 1.

In the form of the invention illustrated the pipe 43 is made in two sections, one connected to the control head 35 and one to the ported member 29 in the manner already described, the connection between the two sections of pipe being shown in detail in Fig. 4. Such an arrangement makes for interchangeability and facilitates assembly and replacements. Referring to Fig. 4, the two sections of pipe may enter through the sides of cup-like members 61 and 63 placed face to face so that the up-like recesses are in communication. These members may be secured by a through screw 65 tapping into a pillar 67 carried by the rear wall of the enclosing case 5. By withdrawing the screw 65 obviously either section of the pipe 43 and the mechanism to which it is attached may be removed without disturbing the mechanism with which the other section communicates.

I have described in connection with the illustrated embodiment of the invention a manual adjustment of the control couple but it will be understood that the adjustment might be effected automatically. I have also described in detail that embodiment of my invention herein illustrated in order that the details of the construction shown might be readily understood. However, this exactitude of description is not to be taken as definitive of the scope of the invention as the mechanical structure and the arrangement and combination of parts might be widely varied without departing from the principles of the invention.

What I claim as new and desire to secure by Letters Patent I shall express in the following claims.

Claims:—

1. In combination with a pressure-fluid servo-motor means for controlling the same comprising a ported member arranged to swing about a center line, a cooperating valve member pivoted at the same center line and piping between said ported element and the servo-motor including two relatively rotatable members disposed at the center line and constituting a swivel joint, whereby swinging movement of said ported member may take place without strain on the piping.

2. In an instrument of the class described in combination with a valve for controlling the passage of fluid through a conduit and pressure-fluid operated moving means therefor, means for controlling said moving means including a responsive member and a valve element operated thereby, an arm carrying a cooperating ported member, an axle for said arm having a hollow end portion in communication with said member, a hollow bearing for the said portion, said portion and bearing having cooperating coned surfaces and a conduit between the bearing and said moving means.

3. In an instrument of the class described having an element through which pressure fluid passes which in the use of the instrument is rotated about an exterior center line and having a relatively fixed source of pressure fluid, means for connecting said element with said source comprising hollow members disposed in said center line and communicating through a pressure-tight swivel joint and rigid piping between said members respectively and said element and source.

4. In an instrument of the class described in combination with a valve for controlling the passage of fluid through a conduit and pressure-fluid operated moving means therefor, means for controlling said moving means including a responsive member and a valve element operated thereby, a cooperating ported member capable of swinging adjustment about an axis, a pipe extending from said member into close proximity to said axis and another pipe connected to said first pipe substantially at said axis.

5. In an instrument of the class described in combination with a valve for controlling the passage of fluid through a conduit and pressure-fluid operated moving means therefor, means for controlling said moving means including a responsive member and a valve element operated thereby, a hollow bearing in communication with said moving means, a hollow shaft turning in said bearing and a pipe extending from said shaft and a ported member carried by said pipe and cooperating with said valve element.

6. In an instrument of the class described wherein a valve couple controls the operation of a servo-motor, a valve element constituting one part of the control couple, a responsive device to swing the same about a center line, a cooperating valve element adjustable relatively to the first element and means to place one of said valve elements in communication with a fixedly located pressure-fluid conduit comprising relatively rotatable hollow members providing a swivel joint at said center line and piping between said members respectively and said conduit and said one valve element.

7. In an instrument of the class described wherein a valve couple controls the operation of a servo-motor, a valve element constituting one part of the control couple, a responsive device to swing the same, a cooperating valve element adjustable relatively to the first by swinging movement about a center line and means to place one of said valve elements in communication with a fixedly located pressure-fluid conduit comprising relatively rotatable hollow members providing a swivel joint at said center line and piping between said members respectively and said conduit and said one valve element.

8. In an instrument of the class described a responsive member, a shaft revolved thereby, a valve swinging about the center line of the shaft under control thereof, a hollow shaft aligned with said first shaft, a hollow bearing therefor communicating therewith and a cooperating valve member carried by said hollow shaft and communicating therewith and thereby with the interior of said bearing.

9. In an instrument of the class described a responsive member, a shaft revolved thereby, a valve swinging about the center line of the shaft under control thereof, an arm on the shaft to move said valve in one direction but capable of lost motion relatively thereto in the other direction, a hollow shaft aligned with said first shaft, a hollow bearing therefor communicating therewith and a cooperating valve member carried by said hollow shaft and communicating therewith and thereby with the interior of said bearing.

10. In an instrument of the class described a hollow shaft, a hollow bearing for the shaft communicating therewith and adapted for connection to a presure-fluid receiving space of a servo-motor, a ported valve element carried by said shaft radially distant therefrom and providing an exhaust therefor, a cooperating valve element swingable about the center line of said shaft and a responsive member for moving one of said valve elements.

11. In an instrument a fixed chamber to receive pressure-fluid having a coned bearing in communication with the interior thereof, a hollow shaft having a coned end supported in said bearing and an opening through said end, a trunnion on the opposite end of the shaft, a plate opposing said bearing socketed to receive said trunnion and a device receiving presure-fluid movable with said shaft.

12. In an instrument a fixed chamber to receive pressure fluid having a port with a bearing surface adjacent thereto, a hollow shaft having a cooperating bearing surface and an opening communicating with said port, said bearing surface adapted to support the shaft rotatively and against end thrust, a trunnion on the opposite end of the shaft, a plate opposing the bearing socketed to receive the trunnion and a device receiving pressure fluid movable with said shaft.

13. In an instrument a fixed chamber to receive pressure fluid having a port with a bearing surface adjacent thereto and an opening communicating with said port, a hollow shaft having a cooperating bearing surface and an opening communicating with said port, said bearing surface adapted to support the shaft rotatively and against end thrust, a device receiving pressure fluid movable with said shaft and means for pressing said shaft frictionally against the bearing which means is yieldable to permit adjusting movement of the shaft.

14. In an instrument a fixed chamber to receive pressure fluid having a port with a bearing surface adjacent thereto and an opening communicating with said port, a hollow shaft having a cooperating bearing surface and an opening communicating with said port, said bearing surface adapted to support the shaft rotatively and against end thrust, a device receiving pressure fluid movable with said shaft and a member secured at a point remote from the shaft and having a portion overlying the same to press the same axially into frictional engagement with the bearing whereby the shaft remains in a given angular position but may be intentionally turned for adjustment.

In testimony whereof, I have signed my name to this specification.

ARNOLD M. DIXON.